J. Thayer,
Butter Package.
No. 96,506.  Patented Nov. 2, 1869.

Witnesses:  Inventor:

United States Patent Office.

J. THAYER, OF PALMYRA, WISCONSIN.

Letters Patent No. 96,506, dated November 2, 1869.

IMPROVEMENT IN BUTTER-PACKAGE.

The Schedule referred to in these Letters Patent and making part of the same.

*To all whom it may concern:*

Be it known that I, J. THAYER, of Palmyra, in the county of Jefferson, and State of Wisconsin, have invented a new and useful Improvement in Packing and Transporting Butter; and I do hereby declare that the following is a full, clear, and exact description thereof, which will enable others skilled in the art to make and use the same, reference being had to the accompanying drawings, forming part of this specification.

This invention relates to a new and improved method of packing and transporting butter for sale and use, and consists in the arrangement hereinafter described.

In the accompanying sheet of drawings—

Similar letters of reference indicate corresponding parts.

Figure 1:
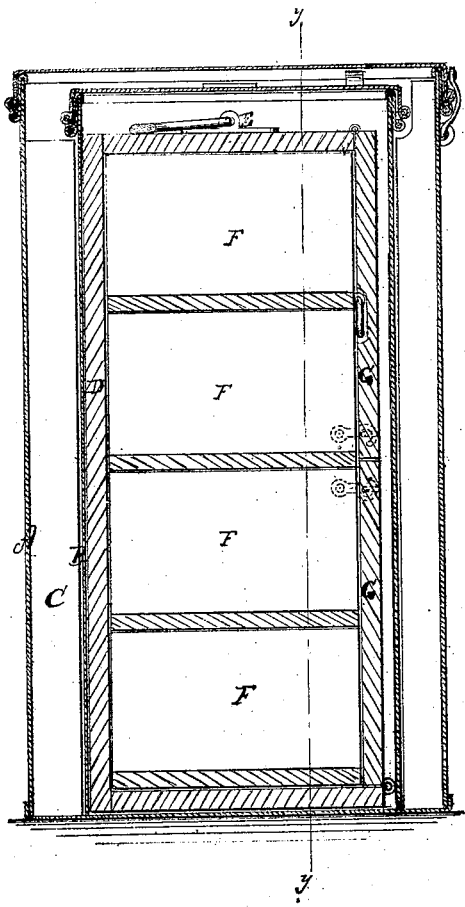
Figure 1 is a vertical section of fig. 2, through the line *x x*.
Figure 2:
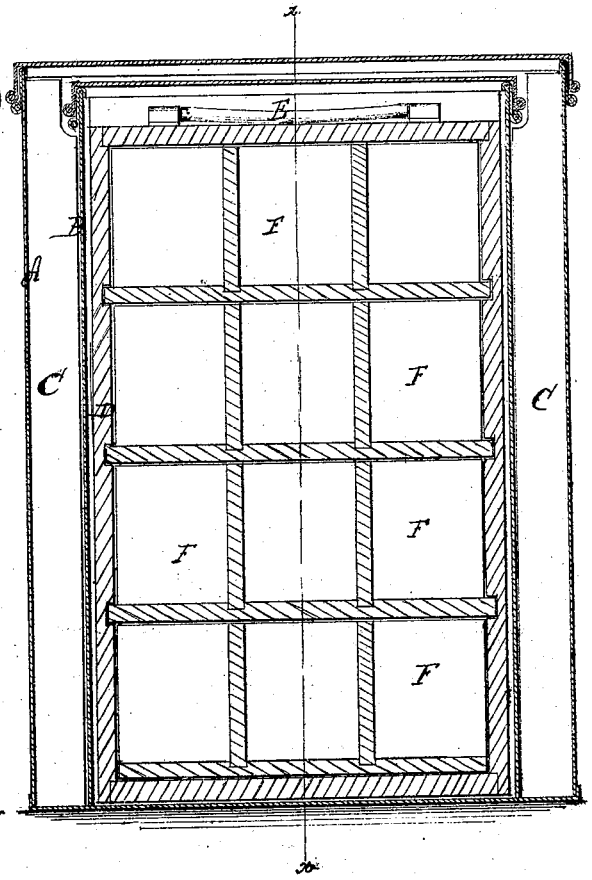
Figure 2 is a vertical section of fig. 1, through the line *y y*.

A represents a tight box, with a hinged cover, in the form of an ordinary chest, made of zinc or other suitable material, and of any desired size.

B is an inner box, made in a similar manner, with a hinged cover, of about the same height, but smaller otherwise, so that when it is placed within A, an annular space, C, is left between the two, as seen in the drawing.

Into this inner box, I fit a case, D, which is readily removed therefrom by means of the handle E.

The interior of this case consists of a series of pigeon-holes, F. These pigeon-holes are made in tiers, which tiers are readily drawn from the case, the same as ordinary drawers.

The case is tightly closed by means of the doors G, as seen in fig. 1. The case, with the pigeon-holes, is made of any suitable material, preferably of wood, and of white or sweet maple.

In the pigeon-holes F, I pack the butter. When the holes or compartments are filled, the doors G are closed, and the case is placed in the inner box B, which is also closed.

The annular space C is filled with ice, when the outer box A is closed, and the butter is ready for transportation.

In taking the butter from the case, the tiers of pigeon-holes are removed separately, from whence the butter is taken in solid bars, or in any desired quantities.

It is designed that the pigeon-holes F shall be of a size to contain about four pounds of butter, so that about fifty pounds may be thus transported in a single case.

In cold weather, the case may be used for transporting butter without the outer boxes or refrigerator, and the advantages to be derived by transporting the butter in cases, as described, are nearly as great in winter (or in cold weather) as in summer, as it is well understood that butter transported in small quantities preserves its sweetness and delicate flavor much better than when packed in large masses, in pots and tubs, in the ordinary manner.

When the butter is taken from the case, it is in much better condition for retail, or for the table, than it is when packed in tubs, where it is necessary to dig it out with a knife or spoon.

From the pigeon-holes it may be taken in whole bars, or in nice squares or cubes, as may be required.

Having thus described my invention,

I claim as new, and desire to secure by Letters Patent—

The combination of a removable wooden butter-receptacle, having a series of apartments, with two surrounding metallic chests, each constructed as described.

J. THAYER.

Witnesses:
  JOHN UGLOW,
  W. J. ALLEN.